(12) United States Patent
Akirav et al.

(10) Patent No.: US 10,606,715 B2
(45) Date of Patent: *Mar. 31, 2020

(54) EFFICIENT HIGH AVAILABILITY FOR A SCSI TARGET OVER A FIBRE CHANNEL

(71) Applicant: INTERNATIONAL BUSINESS MACHINES CORPORATION, Armonk, NY (US)

(72) Inventors: Shay H. Akirav, Petach-Tikva (IL); Oren Bar, Tel Aviv (IL); Roman Barsky, Tel Aviv (IL); Itay Maoz, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/815,058

(22) Filed: Nov. 16, 2017

(65) Prior Publication Data

US 2018/0074922 A1 Mar. 15, 2018

Related U.S. Application Data

(63) Continuation of application No. 14/223,237, filed on Mar. 24, 2014, now Pat. No. 9,852,034.

(51) Int. Cl.
*G06F 11/20* (2006.01)
*G06F 11/14* (2006.01)

(52) U.S. Cl.
CPC ...... *G06F 11/2007* (2013.01); *G06F 11/1423* (2013.01); *G06F 11/2092* (2013.01); *G06F 11/2041* (2013.01); *G06F 11/2046* (2013.01); *G06F 11/2089* (2013.01)

(58) Field of Classification Search
CPC ............ G06F 11/2089; G06F 11/2092; G06F 11/2041; G06F 11/2046; G06F 9/4558; G06F 9/45562; G06F 9/45575; G06F 2201/84
See application file for complete search history.

(56) References Cited

U.S. PATENT DOCUMENTS 6,625,747 B1 9/2003 Tawil et al.
7,260,737 B1 8/2007 Lent et al.
7,290,167 B2 10/2007 Fujibayashi
(Continued)

OTHER PUBLICATIONS

"Wikipedia's World Wide Port Name," https://en.wikipedia.org/w/index.php?title=World_Wide_Port_Name&oldid=546519056, historical version from Mar. 23, 2013 (1 page).

(Continued)

*Primary Examiner* — Joseph O Schell
(74) *Attorney, Agent, or Firm* — Griffiths & Seaton PLLC (57) ABSTRACT

For efficient high availability for a multi-node cluster using a processor device in a computing environment, using duplicate, standby host-bus adaptors (HBAs) for alternate nodes with respect to a node with the duplicate, standby HBAs using duplicate credentials of active HBAs of the node for shutting down the node, taking an active HBA of the node offline, and/or activating one of the alternate nodes. A failed node is shut down by an active one of the plurality of alternate nodes using a fence device, and all jobs of the failed node are taken over by the active node using a shared data structure including SCSI device assignments, SCSI reservations, and required host notifications.

20 Claims, 4 Drawing Sheets

(56) References Cited

U.S. PATENT DOCUMENTS

| | | |
|---|---|---|
| 7,307,948 B2 | 12/2007 | Infante et al. |
| 7,467,191 B1 | 12/2008 | Wang et al. |
| 7,565,568 B1 | 7/2009 | Kumar et al. |
| 7,739,543 B1 | 6/2010 | Pittman et al. |
| 7,778,157 B1 | 8/2010 | Tawri et al. |
| 7,853,019 B1 | 12/2010 | Chaudhary et al. |
| 2002/0133746 A1 | 9/2002 | Chen et al. |
| 2002/0188711 A1 | 12/2002 | Meyer et al. |
| 2003/0204539 A1 | 10/2003 | Bergsten |
| 2007/0088870 A1 | 4/2007 | Mopur et al. |
| 2009/0025007 A1 | 1/2009 | Hara et al. |
| 2013/0238930 A1 | 9/2013 | Umbehocker |
| 2014/0281670 A1 | 9/2014 | Vasseur et al. |

OTHER PUBLICATIONS

"Wikipedia's Fibre Channel Zoning," https://en.wikipedia.org/w/index.php?title=Fibre_Channel_zoning&oldid=595152189, historical version from Feb. 12, 2014 (2 pages).

EFFICIENT HIGH AVAILABILITY FOR A SCSI TARGET OVER A FIBRE CHANNEL

CROSS REFERENCE TO RELATED APPLICATIONS

This Application is a Continuation of U.S. patent application Ser. No. 14/223,237, filed on Mar. 24, 2014.

BACKGROUND OF THE INVENTION

Field of the Invention

The present invention relates in general to computers, and more particularly to efficient high availability for a small computer system interface (SCSI) target over a fibre channel in a computing environment.

Description of the Related Art

In today's society, computer systems are commonplace. Computer systems may be found in the workplace, at home, or at school. A data processing system typically includes a processor subsystem having at least one central processing unit (CPU), an input/output (I/O) subsystem, a memory subsystem and a bus subsystem. These data processing systems may include data storage systems, or disk storage systems, to process and store data. Many of these computer systems include virtual storage components and computing clusters. Computing clusters and virtual storage components are found in a variety of computing environments.

Large amounts of data have to be processed daily and the current trend suggests that these amounts will continue being ever-increasing in the foreseeable future. For the most part, computing systems face a significant challenge to meet the increasingly stringent reliability demands and failure tolerances imposed by many software applications. These data processing systems typically require a large amount of data storage. Customer data, or data generated by users within the data processing system, occupies a great portion of this data storage. Moreover, these complex computing architectures experience failures causing disruption to the system. Accordingly, it would be desirable to improve computing efficiency during a computing failure within the data storage systems without compromising reliability and data availability.

SUMMARY OF THE DESCRIBED EMBODIMENTS

In one embodiment, a method is provided for efficient high availability for a small computer system interface (SCSI) target over a fibre channel, in a computing environment. In one embodiment, by way of example only, a method comprises using duplicate, standby host-bus adaptors (HBAs) for alternate nodes with respect to a node with the duplicate, standby HBAs using duplicate credentials of active HBAs of the node for shutting down the node, taking an active HBA of the node offline, and/or activating one of the alternate nodes. A failed node is shut down by an active one of the plurality of alternate nodes using a fence device, and all jobs of the failed node are taken over by the active node using a shared data structure including SCSI device assignments, SCSI reservations, and required host notifications.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned above, large amounts of data have to be processed daily and the current trend suggests that these amounts will continue being ever-increasing in the foreseeable future. To handle such large amounts of data, cluster-computing architectures have recently advanced such that clusters of computers are now being used in the academic and commercial community to compute solutions to complex problems. A cluster is a group of computers, also known as nodes, which work together to form a single computer system. Cluster computing comprises a multiplicity of conventional workstations, servers, PCs, and other computer systems interconnected by a high-speed network to provide computing services to a multiplicity of clients. Each computer system (PC, workstation, server, mainframe, etc.) is a node of the cluster. The cluster integrates the resources of all of these nodes and presents to a user, and to user applications, a Single System Image (SSI). The resources, memory, storage, processors, etc. of each node are combined into one large set of resources. To a user or user application, access to the resources is transparent and the resources are used as though present in a single computer system. Generally, a cluster system refers to a system for integratedly managing a virtual image program by grouping of nodes having the similarity there between.

There are different categories of clusters, including, but not limited to, a high availability cluster and grid cluster. The high availability cluster is employed to improve the availability of the services of the cluster wherein each member of the cluster is in communication with a multiple storage devices. A high availability cluster includes one or more nodes to prepare for a failure on any node of them, or in other words, if one node fails, it is possible to continue the backup on another node. Moreover, the high availability cluster checks, at any time, a state of an individual node to dynamically remove a failed node in the cluster, allows other nodes to perform a corresponding task in behalf of the failed node, and allows a recovered node to join the cluster again. An enterprise-level clustered backup server solution enables high performance and high availability.

Automated data storage libraries are known for providing cost effective storage and retrieval of large quantities of data, especially in a computing cluster environment. For example, the automated data storage libraries may include a virtual tape library (VTL). A VTL is a data storage virtualization technology used typically for backup and recovery purposes. A VTL presents a storage component (usually hard disk storage) as tape libraries or tape drives for use with existing backup software. Moreover, a typical virtual storage component is the magnetic tape cartridge used via a magnetic tape drive. Multiple tape drives may be contained in a tape library, along with several slots to hold tape cartridges. Such data storage systems utilize storage components (usually direct access storage, such as disk arrays) to virtually present tape libraries or tape drives. Both types of technologies are commonly used for backup and recovery purposes. Virtual tape libraries, which integrate with existing backup software and existing backup and recovery processes, enable typically faster backup and recovery operations.

The automated data storage libraries provide a means for storing data on data storage media that are not permanently mounted in data storage drives, and that are stored on storage shelves inside the library. One or more robot accessors retrieve selected data storage media from storage shelves and provide them to data storage drives. Host computers communicate with the automated data storage library through control paths. A control path is a communication interface that comprises library control commands or signals. The control path interface may comprise serial interfaces such as RS-232, small computer system interface (SCSI), FC-AL (Fibre Channel-Arbitrated Loop), etc. The SCSI is generally used to couple a computer system to a device or to couple computer devices together. Communications are provided between a computer system and a device or provided between devices through the SCSI interfaces and by using a SCSI protocol. A SCSI, however, is limited to the distance within which signals may be able to traverse or be transmitted. Typically, signal degradation begins to occur for a SCSI within a twenty (20) meter range. SCSI extenders were developed to overcome the distance limitations of a SCSI and the degradation of signals through SCSI cables. One conventional SCSI extender converts from SCSI to another protocol, such as fibre channel (FC), to extend the transmission of SCSI signals. Fibre channel (FC) is an optical form of transmission. A SCSI to FC converter is used to convert SCSI signals to FC signals. A fibre channel protocol is used to process the transmission of the fibre channel signals. A FC to SCSI converter is then used to convert the FC signals back into SCSI signals.

In certain system configurations, a host may include multiple host bus adapters (HBAs) that provide multiple physical paths to a device, such as a dual ported tape device. Each of these physical paths could function as one or more control paths. More specifically, two types of path failover capabilities exist: control path failover (CPF) and data path failover (DPF). Control refers to the command set that controls the library (the SCSI Medium Changer command set on LUN 1 of the tape drives). Data refers to the command set that carries the customer data to and from the tape drives (the SCSI-3 Stream Commands (SSC) device on LUN 0 of the tape drives). Path failover means the same thing in both: that is, where there is redundancy in the path from the application to the intended target (the library accessor or the drive mechanism, respectively), the device driver transparently fails over to another path in response to a break in the active path. Both types of failover include host-side failover when configured with multiple HBA ports into a switch, but CPF includes target-side failover through the control paths that are enabled on more than one tape drive. DPF includes target-side failover for the dual-ported tape drives that are supported by a tape library, such as the IBM® TS3500™ Tape Library.

For example, assume there is a two-node clustered emulation of the IBM® TS3500™ Tape Library. Redundancy is achieved by emulating the TS3500™ Tape Library SCSI Medium Changer (SMC) or alike, which enables multiple assignments and control path failover (CPF). In other words, it is possible to set two or more paths to the robot from the initiator; at least one path to a port on the first node, and another path to a port on the second node as shown FIG. 3, below. Using an initiator, tape driver (or one of its variants), the initiator is aware that there are two or more paths to the robot, and in case one of the paths is down, the initiator tries sending commands through the alternative paths.

Using the above CPF and multiple assignments mechanism enables the backup application to continue running in case of one node experiences a failure; the backup application will use the SMC on the active (live) node to mount and/or unmount cartridges to and/or from tapes, and will use the tapes on the live node for backup.

The DPF is similar to CPF, but differs in that DPF is an automatic failover for the transfer of data, which provides error recovery for systems connected to tape drives, while the CPF is an automatic failover support for the transfer of commands to move tape cartridges. The difference in the implementation originates from SCSI limitation of a single representation (representation means world wide network port and the logical unit number "LUN") of the tape as opposed to the robot that may have multiple representations. More particularly, a representation means that each tape may be assigned to a single port on a single node.

If a host application, such as a data backup application or device driver, is sending commands to an automated data storage library using a data path and the data path experiences a failure, such as a permanent path error (e.g., a failure in the HBA or cable), then the application would cease operating down the failed path. Once a failure occurs, the host driver should use a different tape, get the cartridge from the failed tape device using CPF and represent the abstraction of the multipath tape to the upper layer application. In such a case, failover procedures may be invoked either by a system administrator or automatically by the host computer to either restart the application, or reissue the command, down an alternate path.

If the host computer restarts the application, then any operations performed by the library prior to the failure may be lost. This can create large delays because the application may have to repeat work that may have already been completed. If the host computer reissues the command down an alternate path without knowing if the previous command sent to the automated data storage library was successfully completed then errors may occur. For example, a host computer may encounter a loss of library communication while moving media between a storage slot and a drive. The host computer may not be able to determine if the command completed successfully because there was no response from the automated data storage library to the command. If the host computer retries the same command then it may fail because the library has already successfully completed the command. In other situations, the command retry may cause the cartridge to be moved away from its intended destination if the library has successfully completed an exchange command. For these reasons, there is a need in the art for improved techniques for managing failover operations for automated data storage libraries.

While such operations provide some high availability, there are several downsides such as: 1) a backup may continue only on the live node tape drives, 2) due to customer's setup (port assignments or LUN masking) it is possible that some libraries and/or some initiators will not be able to have any backup operations since there are no available tape drives for them, 3) it is still a disruptive failure, which takes some time for the backup application to recover from, 4) the backup streams fail and some backup applications may fail the entire backup session as a consequence, 5) such operations are dependent on an initiator tape driver (a tape and its variants) implementation, and a) only the platforms that have the specific tape driver may support CPF and DPF, and introduction and support of new platforms are expensive, and b) an existing DPF requires substantial algorithmic support from host's driver, 6) such operations are not transparent to the backup application layer, and 7) such operations may be viewed as an incomplete high availability solution or even not a high availability solution at all.

Thus a need exists for a full high availability solution in the form of seamless failover (e.g., a tape drive failover). Tape drives failover means that when one node fails all the drives assigned to this node are "reassigned" to the live node. Extra/Alternative HBAs are used on every node in the cluster, and these alternative HBAs use the same (e.g., duplicate) world wide node name (WWNN) and world wide port name (WWPN) as the acting HBAs on the other node. These alternative HBAs are normally kept offline. In case of a node failure, a fence device shuts the failing node down, and the backup, alternative HBA is brought online, and the latter, alternative HBA mimics the failing node's HBA. All the meta-data used to service requests by the cluster is stored in shared memory or other common storage. In this way, all the meta-data is available if there is a failover. The backup host detects the communication disruption with the failing node, and tries to re-login. At this time the backup, alternative HBA is up and the live node gets the jobs of the failed node based on the state stored in shared memory. Using clusters infrastructure (e.g., fence device, heartbeat private network, watch-dogs etc.) and proper intra-node signaling, the uniqueness of WWNNs and WWPNs is guaranteed. In short, efficient high availability for a small computer system interface (SCSI) target over a fibre channel is achieved by using duplicate, standby host-bus adaptors (HBAs) for alternate nodes with respect to a node and the duplicate, standby HBAs using duplicate credentials/addresses (e.g., WWNNs and WWPNs) of the active HBAs of the node for shutting down the node, taking an active HBA of the node offline, and/or activating one of the alternate nodes. In this way, there is 1) no need for a host dedicated driver, 2) a minimal disruption for backup application, and 3) there is no need for a single root input/output (I/O) virtualization (SRIOV) or other I/O virtualization techniques support, which do not exist in several fibre channel cards, and/or are not supported by some operating systems.

In one embodiment, the present invention provides assumes an active-active n-node cluster solution, (e.g., with n being a variable greater than or equal to 2, n≥2), with fence device. Multiple algorithms for quorum management may be used, and the quorum may decide quickly which node is no longer in the quorum and therefore the node is fenced. Fencing the unresponsive node is required to eliminate the "split-brain" condition, in which several nodes believe they are the only one running, and which may lead to data corruption on a shared storage. A server cluster is capable of online migration of drives (e.g., tape drives) from one node to another in a timely manner. The number of fibre channel ports is doubled. The backup application and/or host should be capable of performing re-login based on WWNN or WWPN, and not a fibre channel identifier (FC_ID or FCID). The host performs re-login using the WWNN or WWPN since the fabric login (FLOGI) in a fibre channel is not guaranteed to get answered with the same FC_ID in case of accidental short link disturbance. The host also maintains all backup jobs.

In one embodiment, the present invention explicitly allows for the use of any host driver, without the need in a multipath driver, and the present invention enables for an N-node cluster, for any N>=2. In one embodiment, the present invention solves the problem with simpler tools, utilizing bare physical ports. Therefore, maximum throughput per port is achieved, even while in failover mode, and there is no requirement that the hardware necessarily supports N_Port ID Virtualization (NPIV). The standby ports may have a pre-assigned identity in the static mode and makes it much more simple to control the takeover in case of a node failure and is less error-prone and resilient. In one embodiment, any kind of cluster-enabled storage as a back-end. Specifically, it may be even a single storage server.

Figure 1:
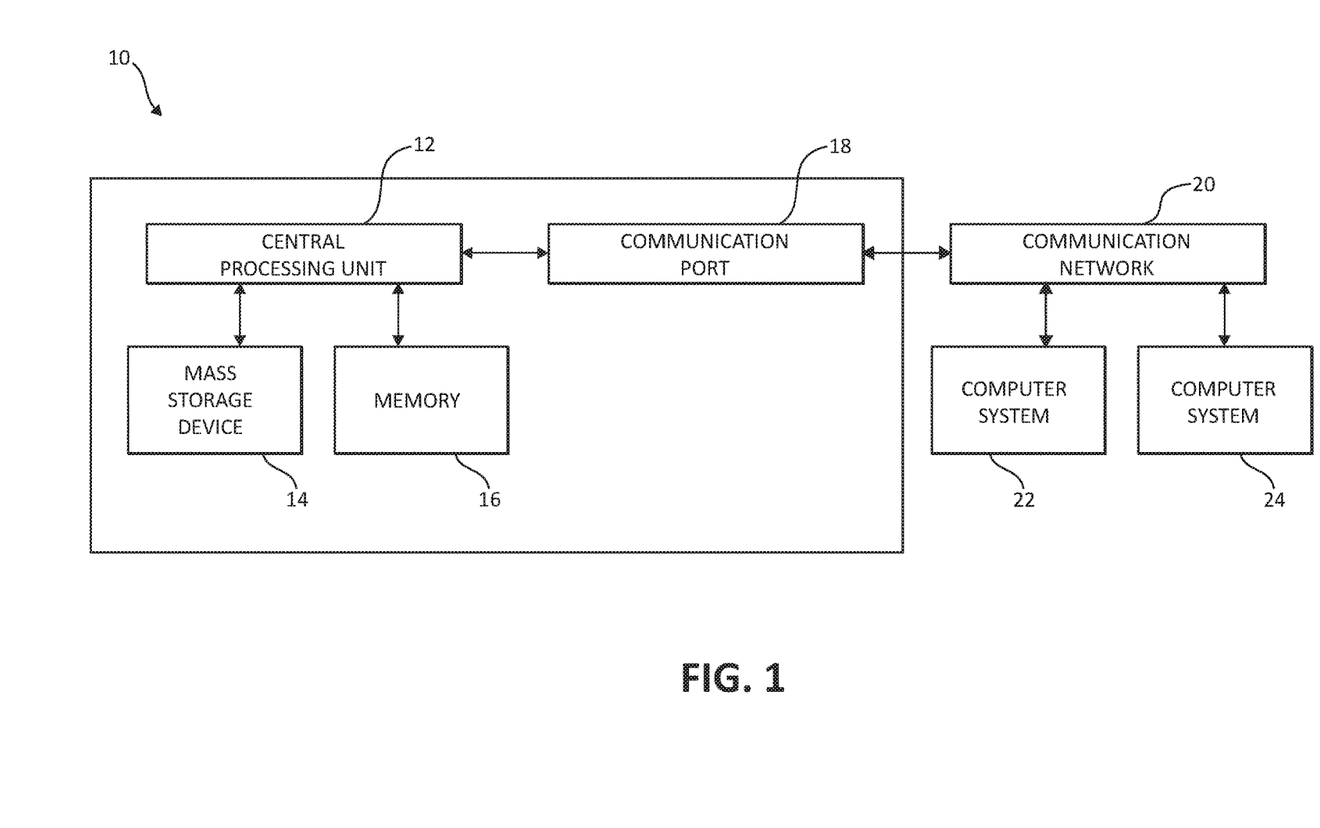
FIG. 1 is a block diagram illustrating a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
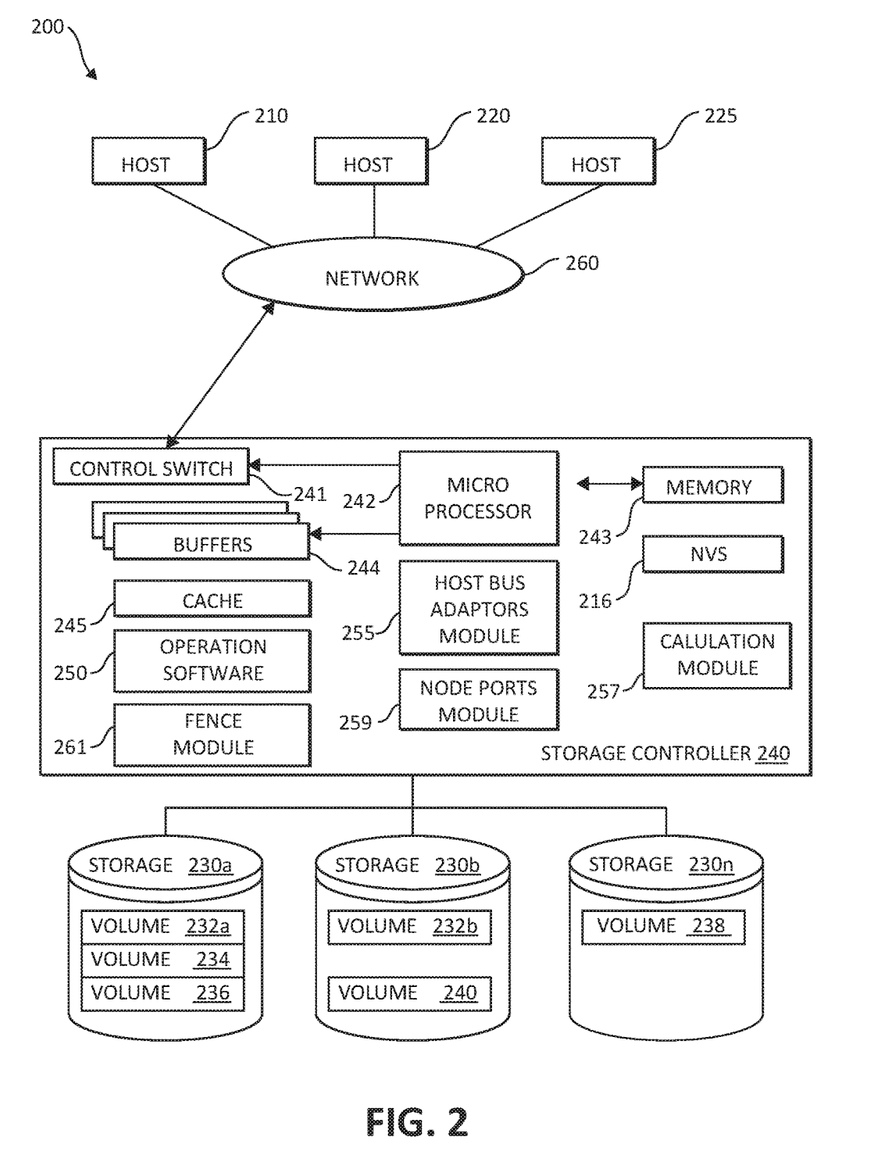
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™ and/or the IBM® TS3500™ Tape Library. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a host bus adaptors (HBA) module 255 (both active HBA and alternative HBA), a calculation module 257, a node ports module 259, and a fence module 261. The host bus adaptors (HBA) module 255, the calculation module 257, the node ports module 259, and the fence module 261 may work in conjunction with each and every component of the storage controller 240, the hosts 210, 220, 225, and storage devices 230. The host bus adaptors (HBA) module 255, the calculation module 257, the node ports module 259, and the fence module 261 may be structurally one complete module or may be associated and/or included with other individual modules. The host bus adaptors (HBA) module 255, the calculation module 257, the node ports module 259, and the fence module 261, may also be located in the cache 245 or other components.

The storage controller 240 includes a control switch 241 for controlling the fibre channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the host bus adaptors (HBA) module 255, the calculation module 257, the node ports module 259, and the fence module 261, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, read/write operation handler 255, the acknowledgment module 257, the data allocation table module 259, the error/failure recovery module 261, and the primary/secondary node module 263 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the host bus adaptors (HBA) module 255, the calculation module 257, the node ports module 259, and the fence module 261, may also be located in the cache 245 or other components. As such, one or more of the host bus adaptors (HBA) module 255, the calculation module 257, the node ports module 259, and the fence module 261, maybe used as needed, based upon the storage architecture and user's preferences.

As described herein, the present invention provides a solution for efficient handing of semi-asynchronous RAID write failures. In one embodiment, the present invention is restricted to a RAID storage device type architecture, which serves all of its READ I/O from its primary copy only. In an alternative embodiment, the present invention is not restricted to RAID storage device type architecture and may be implemented in a variety of computing type architectures. For example, one computer architecture (e.g., IBM®) design point allows for an elegant and simple implementation of the described herein. Under one computer architecture (e.g., IBM®) design, the primary copy is excluded from the computing system with the secondary copy becoming a new primary copy and the rest of the recovery will create a new secondary copy off the new primary copy (e.g., the converted secondary copy). The focus of the description herein is handling of a write failure on the secondary copy alone and relying on that design to address all other issues.

Because of historical reasons and the need to be backward compatible with storage behavior, when RAID systems are based on single disks, the RAID systems seem to take on a pessimistic approach and, cater best to failures so that a failure is recognized and handled as soon as possible. A write failure is returned to the host after exhausting internal re-write operations, which are transparent to the hosts. Thus the present invention provides a solution to handle a good path (e.g., a non-failed path) and storage problems internally, and if the system cannot handle and fix the failures, the present invention reports those failures to the application layer at the last possible time (e.g., using a timer, a predetermined time, and/or calculation). Internal recovery procedures are provided to address write-failures as long as the failed writes are not consumed through a read. To do so, in one embodiment, the present invention commits a write on the primary copy and sends the data to the secondary entity awaiting an ACK from the secondary entity. The ACK, as described herein, means that the metadata for the write operation (specifically the write addresses) had arrived at the other end (e.g., the secondary entity), but does not mean that the data itself was successfully committed there. In other words, the data may have and/or may not have been successfully committed. The present invention allows for the secondary node to try recovery actions without negatively affecting the write latency, which will be acknowledged as soon as the primary receives the ACK from the secondary. If the secondary node fails to commit the data on its end, the secondary node can fail the relevant component (e.g., a disk and/or the entire module) and trigger a rebuild process that will return the whole storage into a full redundant state when that rebuild is complete (e.g., rebuild on the secondary node).

In the event of a double concurrent failure, where the second node is in the midst of a write re-try and/or other plausible recovery actions and/or the primary node/copy is lost thereby forcing the secondary entity (e.g., secondary node) into becoming the new primary entity (e.g., primary node), the secondary entity may return a read failure to a hosts' applications when a read of a stale block arrives, before any successful write was made to the secondary entity. The handling of the write error of the secondary copy is delayed to the very last possible time, allowing for internal recovery actions to be attempted and/or for a fresh new host write operation to be written to the stale block thereby turning the block to be a valid block. It should be noted that if manual intervention is required to recover stale blocks, the secondary node has all those uncommitted writes waiting as they were sent to it and were received successfully based on the ACK it had sent to the primary early on.

In one embodiment, each data storage system/module (which controls a set of storage systems such as disks or other type of storage devices) have a fixed stale table. For example, in one computer architecture (e.g., IBM® and/or the XIV® GEN-3) have 12 3 TB disks in each module. Half of the disks' space is used for secondary copies. Assuming the granularity that is tracked is of 4 KB, then the size of the stale table is around 100 MB or 200 MB. As the table is of fix size, there are no issues with data allocation schemes and latencies. In one embodiment, a bit is set to either "on" or "off" and such setting should always succeed. If the operation doesn't succeed, such failure indicates a significant problem with the data storage system/module (not merely a disk) and calls for a timely failing of the respective module so that the hosts will be able to choose alternate path. This enables the host to be more efficient and fast for their work and, in doing so, minimizes the performance degradation experienced currently, when the recognition of an interface module problems takes too long.

In one embodiment, by way of example only, the secondary node sends the ACK to the primary entity right after the secondary node marks the respective block as stale. The semi-asynchronous ACK allows for the write operation to return a success to the host before the data is committed on the secondary entity. This provides for faster write operation, yet it doesn't expose the host to any data inconsistency event, even if there are concurrent double failures. If, considering a worst-case scenario, there is a failure of a read of a stale block, if an intervention operation is required, all data that would have been on the secondary node is still available based on use of the operations described herein of the present invention. In case there are number of writes targeting the very same data block, all pending writes are aborted so that the latest data ends up written.

Figure 3:
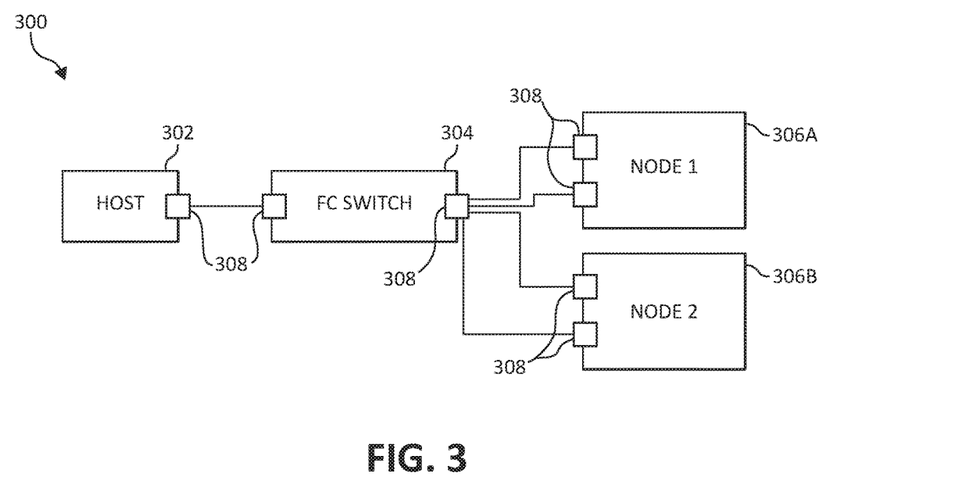
FIG. 3 is a block diagram illustrating a hardware structure of a two-node virtual tape server connected to a host via a fabric in a computer system in which aspects of the present invention may be realized.

FIG. 3 is a block diagram illustrating a hardware structure 300 of a two-node virtual tape server connected to a host via a fabric in a computer system in which aspects of the present invention may be realized. Here a host 300 is in communication with a first node 306A and a second node 306B via a fibre channel switch 304 using port connections 308. There are two dual ports cards 308 on each node 306 and there are assignments for the v SCSI Medium Changer (SMC) on all ports 308. Hence, redundancy is achieved by emulating the SMC or similar computing structure, which enables multiple assignments and control path failover (CPF).

Figure 4:
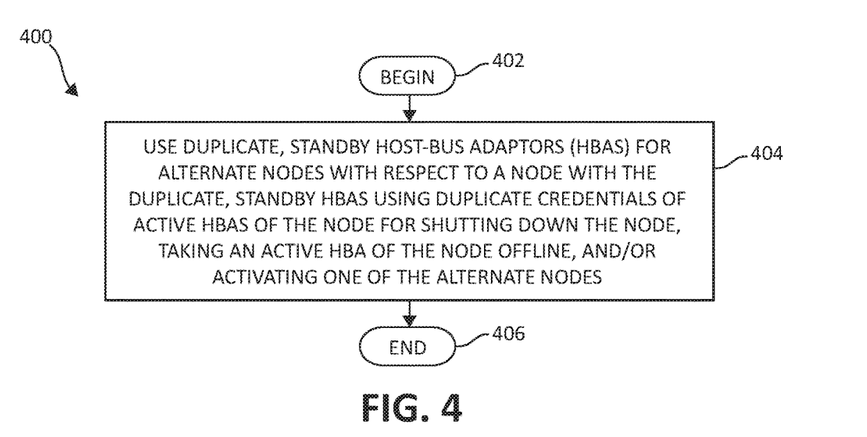
FIG. 4 is a flowchart illustrating an exemplary method for efficient high availability for a small computer system interface (SCSI) target over a fibre channel in which aspects of the present invention may be realized.

FIG. 4 is a flowchart illustrating an exemplary method 400 for efficient high availability for a small computer system interface (SCSI) target over a fibre channel in which aspects of the present invention may be realized. The method 400 begins (step 402) by using duplicate, standby host-bus adaptors (HBAs) for alternate nodes with respect to a node with the duplicate, standby HBAs using duplicate credentials of active HBAs of the node for shutting down the node, taking an active HBA of the node offline, and/or activating one of the alternate nodes (step 404). The method 400 ends (step 408).

Figure 5:
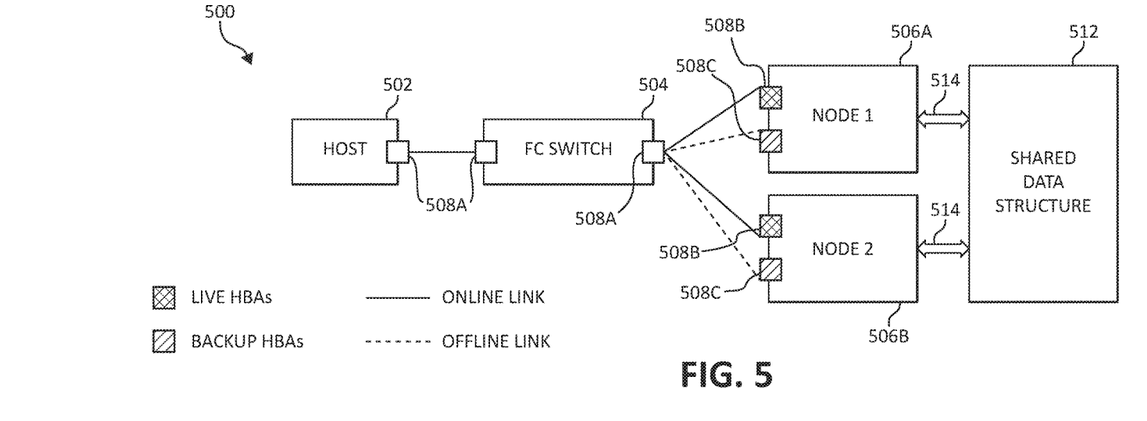
FIG. 5 is a block diagram illustrating a hardware structure of a two-node high availability for a SCSI target over a fibre channel with redundant fibre channel standby ports in a computer system in which aspects of the present invention may be realized.

FIG. 5 is a block diagram illustrating a hardware structure 500 of a two-node high availability for a SCSI target over a fibre channel with redundant fibre channel standby ports in a computer system in which aspects of the present invention may be realized. Here a host 502 is in communication with a first node 506A and a second node 506B via a fibre channel switch 504 using port connections 508 (e.g., 508A-C). A shared data structure 512 is also in communication with each of the nodes 506. Each node 506 contains an active or live HBA 508B and an alternative or backup HBA 508C. FIG. 5 also depicts online links 514 that are active paths and also offline links 516 that are inactive paths. It should be noted that FIG. 5 depicts a two-node cluster environment, but the present invention, as described herein, is suitable for cluster of any size. Also, the live and the backup ports may be multiplied for the performance purposes. For performing a setup operation, the HBA cards 508 will be used as following: one card (one card contains 2 ports) 508 on each node 506 for the regular assignments and one card 508 on each node 506 (2 ports) for high availability (as "standby", or "backup"). The ports 508 are doubled for the sake of performance. Using the configurability option of HBA's WWNN and WWPN, the following is the setup for Node 1 (506A). HBA1 508B, which are live HBAs, use WWPN1 and WWPN2 for regular assignments. HBA2 508C, which are the backup HBAs, use WWPN3, WWPN4 as replica for node 2 in standby mode.

For the setup of Node 2, HBA1 508B, which are live HBAs, use WWPN3, WWPN4 (duplicate addresses of the HBA2 508C in node 1) for regular assignments. HBA2 508C, which are the backup HBAs, use WWPN1, WWPN2 (duplicate addresses of the HBA1 508B in node 1) as replica for node 1 in standby mode. On the backup HBAs 508C the link 516 will remain down (offline) as long as the peer node 506 is up. This ensures uniqueness of the WWPNs and WWNNs as seen by fabrics. The SCSI state of both nodes 506A and 506B is stored in the shared data structures 512 using shared memory or other mechanism. All SCSI assignments will be duplicated on the standby HBAs 508C, i.e. all the ports plus logical unit number (LUN) mapping. The same applies for LUN masking.

Figure 6:
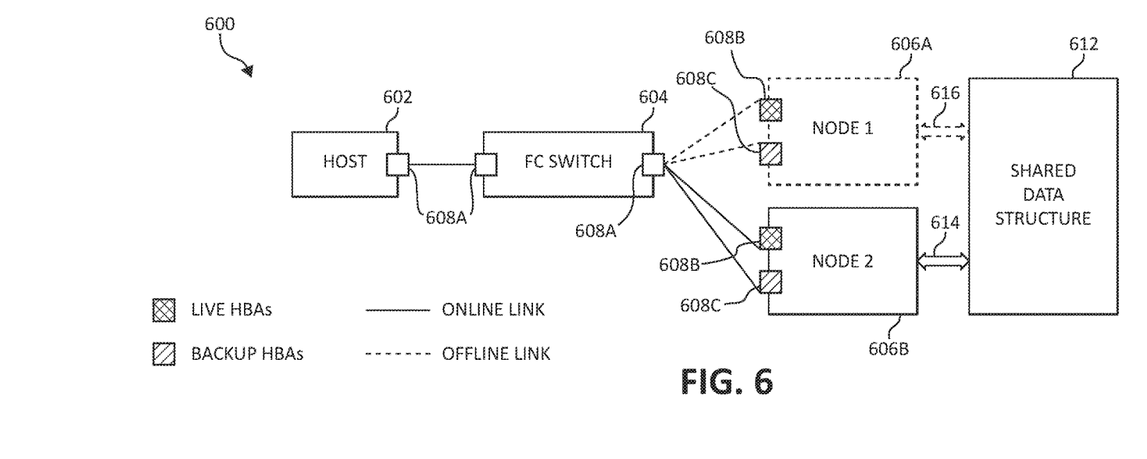
FIG. 6 is a block diagram illustrating a hardware structure of a two-node high availability for a SCSI target over a fibre channel with redundant fibre channel active ports at an alternative node after a first node fails in a computer system in which aspects of the present invention may be realized.

FIG. 6 is a block diagram illustrating a hardware structure of a two-node high availability for a SCSI target over a fibre channel with redundant fibre channel active ports at an alternative node after a first node fails in a computer system in which aspects of the present invention may be realized. Here a host 502 is in communication with a first node 606A and a second node 606B via a fibre channel switch 604 using port connections 608 (e.g., 608A-C). A shared data structure 612 is also in communication with each of the nodes 606. Each node 606 contains an active or live HBAs 608B and an alternative or backup HBAs 608C. FIG. 6 also depicts online links 614 that are active paths and also offline links 616 that are inactive paths. It should be noted that FIG. 6 depicts a two-node cluster environment, but the present invention, as described herein, is suitable for cluster of any size. Also, the live and the backup ports may be multiplied for the performance purposes.

In the event a node experiences a failure, the live node shuts 606B the failing node down 606A using a fence device, which is a part of an existing cluster infrastructure. The failing node's 606A HBA links 616 go down. The live node 606B brings the links 614 of the "standby" ports up (which in/associated with the backup HBAs). The standby ports register themselves with the fabrics with the same FC credentials as the failed node. Node 2 606B takes over all the jobs of the failed node 606A using the shared data structure 612, including SCSI devices assignments, reservations, required host notifications etc. The fabric 604 notifies the host 602 regarding the port configuration changes (RSCN), and the host 602 re-logins to the stand-by ports. An initiator (not shown) will experience this as a short FC disconnection, and not a permanent/long drives failure, and the backup operations may continue. Node 2 606B sends the initiator a position lost status. A backup port may be assigned a new FC_ID, which does not pose a problem for the host, as even a short disconnection may anyway lead to an FC_ID change.

In one embodiment, by way of example only, the following may be performed upon a second node coming up (e.g., online). When the failing node comes up, all the ports are in "down" state. The failing node signals the second node that it is now up/online. The second node shuts the backup HBAs down. The failing node brings online the failing node's HBAs. These last two actions are performed for load balancing and high performance.

Given the use of fibre channels, the fibre channel switch allows for configuring zones. Fibre channel zoning is the partitioning of a fibre channel fabric into smaller subsets to restrict interference, add security, and to simplify management. All the "regular" ports and their replica "standby"

ports are in the same zone. The uniqueness of WWPNs and WWNNs is achieved by keeping the backup ports down using proper signaling between the nodes and the fence device in case a node becomes unresponsive. The state of the other node is always known (to the extent of short periods of time e.g. until other node failure detected) and we already count on the same cluster and fencing mechanism that avoids "split brain" and data corruption.

In the SCSI layer, there will be the same assignments duplicated on both nodes. Through the cluster management service it is determined at each point in time if one node or two nodes are up. When only a single node is up/online: 1) all ports are active, and the SCSI commands are forwarded to the relevant LUNs, and 2) there is a global state within the shared data structure indicating there is only one node up and all devices are seen through it. When two nodes are up/online: 1) the backup ports are down (offline), and only the main ports send commands to the relevant LUNs, and 2) the backup ports are down (offline), and the SCSI commands are not transferred by them, waiting for another node's failure.

In one embodiment, the present invention may be employed in multi-node clustered environment, and works with a cluster of any size bigger than or equal to two. For example, assume each node has one active HBA. The nodes in the cluster are required to have several "extra" HBAs in order to get high availability; and the total number of a node's HBAs is denoted as "FC link arity". Let the cluster be n node (n is a variable reflective of the amount of nodes that may be more than 1), and the required fault tolerance is m (at most m nodes fail and the cluster is still operational), and the arity of the FC link is r; where m is less than n (e.g., m<n).

For example, consider example 1 having 2 nodes and allow 1 failure. Each node should have r ("=" is equal to)=ceiling(2/(2-1))=2: where there is one active HBA plus one spare HBA. The total HBAs is n*r=[2 nodes]*[2 HBAs per node]=4. The total spare HBAs (is equal to)=4-2=2.

In another example, consider example 2 having 3 nodes and allow 1 failure (assuming it is possible to dynamically set WWN/WWPN). Each node should have r (equal to)=ceiling(3/(3-1))=2: where there is one active HBA plus one spare HBA. The spare HBA on one of the nodes will be assigned the WWN of the failed node. The total HBAs (is equal to)=n*r=[3 nodes]*[2 HBAs per node]=6. The total spare HBAs (is equal to)=6-3=3.

Consider example 3 having 3 nodes and allow 2 failures. Each node should have r (equal to)=ceiling(3/(3-2))=3: one active HBA and two spares HBA's. The spares on the live node will be assigned the WWN of the failed node (in this case dynamically setting the WWN is not a must). The total HBAs (is equal to)=n*r=[3 nodes]*[3 HBAs per node]=9. The total spare HBAs (is equal to)=9-3=6.

Another example (example 4) is a scenario having 4 nodes and allow 1 failure (assuming it is possible to dynamically set WWN/WWPN). Each node should have r (equal to)=ceiling(4/(4-1))=2: one active HBA plus one spare HBA. The spare HBA on one of the nodes will be assigned the WWN of the failed node. The total HBAs (is equal to)=n*r=[4 nodes]*[2 HBAs per node]=8. The total spare HBAs (is equal to)=8-4=4.

Another example (example 5) is a scenario having 4 nodes and allow 2 failures (assuming it is possible to dynamically set WWN/WWPN). Each node should have r (equal to)=ceiling(4/(4-2))=2: one active HBA plus one spare HBA. The spare on two nodes will be assigned the WWN of the failed nodes. The total HBAs (is equal to)=n*r=[4 nodes]*[2 HBAs per node]=8. The total spare HBAs (is equal to)=8-4=4.

Example 6 is a scenario having 4 nodes and allow 3 failures. Each node should have r (is equal to)=ceiling(4/(4-3))=4: one active HBA plus 3 spare HBAs. The spare HBA on the live node will be assigned the WWN's of all the failed nodes. The total HBAs (is equal to)=n*r=[4 nodes]*[4 HBAs per node]=16. The total spare HBAs (is equal to)=16-4=12.

It should be noted that in case there are n nodes and it is desired to support a failure of (n-1) nodes (full high availability), then each node will have n HBAs, and therefore total of n^2 (n square) nodes. In this case, it means there are n active HBAs, and thus n^2-n spare HBAs.

In case a system supports full high availability (as above, allowing (n-1) failing nodes), the ability to dynamically set the WWN is not needed, since a spare HBA is needed on each node for each HBA (this is where the n^2 comes from).

In case a system support failure of m nodes, where m<(n-1), (see the example of 4 nodes and 2 failures above), then the system needs the ability to set dynamically the WWN in order to have fewer spare HBAs. In the 4 nodes and 2 failures example 1 spare node will suffice. From the above, it is concluded that if it is not possible to set dynamically the WWN (most HBAs allow it, but theoretically speaking), then a computing system needs to full redundancy in any case, and can support the full high availability in any case.

In case m nodes fail, there are (n-m) live nodes. Therefore:

$$(n-m)*r=n, \qquad (1)$$

$$\text{and } r=n/(n-m), \qquad (2).$$

The theoretical minimal number of redundant ports per node is r-1, and the total number of additional redundant HBAs in the cluster is $$n*(r-1) = n*r - n = n*\left[\frac{n}{n-m}\right] - n, \qquad (3).$$

This equation represents a ceiling value, which is the total number of redundant HBA's (is equal to)=n*r-n=n*(r-1) =n*(ceiling(n/(n-m))-1), such as ceiling(3/2)=2, ceiling(4/2)=2, and ceiling(5/2)=3.

Particularly, for n=2 and m=1 (e.g., a two-node cluster), the number of required additional HBAs is two. For m=n-1, (full availability) the number of required redundant HBAs is $n^2$-n. If the WWNs are dynamically set, then for any size of the cluster the minimal allowed amount of additional HBAs is 2, but for full high availability you need n-1. The present invention allows for a single node failure at a time. In one embodiment, the cluster has 2 nodes (e.g., node 1 and node 2). Both node 1 and node 2 have one spare HBA each. If node 2 fails, node 1's spare HBA is assigned a WWN of the failed node. If node 1 fails, node 2's HBA is assigned the WWN of node 1. If the WWNs may not be changed at runtime, that is the WWNs are pre-assigned, the number of spare HBAs is (n-1) per node, and n*(n-1)=$n^2$-n spare HBAs in the system. Each node has exactly n-1 redundant ports, such that each of the ports is referenced by other nodes.

For efficient high availability for a multi-node cluster using a processor device in a computing environment, using duplicate, standby host-bus adaptors (HBAs) for alternate nodes with respect to a node with the duplicate, standby HBAs using duplicate credentials of active HBAs of the node for shutting down the node, taking an active HBA of the node offline, and/or activating one of the alternate nodes.

In one embodiment, if the node fails, the present invention may perform at least one of: shutting down the failed node by an active one of the plurality of alternate nodes using a fence device, bringing up standby ports of the plurality of duplicate, standby HBAs by the active node, and registering the standby ports of the plurality of duplicate, standby HBAs using the duplicate credentials of the failed node, wherein the duplicate credentials include at least duplicate address links of the active HBAs of the failed node, taking over all jobs of the failed node by the active node using a shared data structure, and notifying a host of port configuration changes, wherein the host logins into the standby ports.

In one embodiment, by way of example only, the present invention performs at least one of: maintaining ports of the failed node in a down state while reactivating the failed node, issuing a notification to an active one of the plurality of alternate nodes with respect to the failed node that the failed node is now a reactivated node, shutting down the plurality of duplicate, standby HBAs by the active one of the plurality of alternate nodes, and activating by the reactivated node the HBAs of the reactivated node.

In one embodiment, all ports and all standby ports in a similar zone. In one embodiment, by way of example only, the present invention performs at least one of: setting or determining a total a number of the plurality of duplicate, standby HBAs, and maintaining a minimum number of standby ports of the plurality of duplicate, standby HBAs.

In one embodiment, the present invention mimics an active HBA of the node by the plurality of duplicate, standby HBAs using duplicate world wide node name (WWNN) and world wide port name (WWPN) of the active HBAs of the node when the node is failing.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for efficient high availability for a small computer system interface (SCSI) target over a fibre channel using a processor device in a computing environment, the method comprising:
   using a plurality of duplicate, standby host-bus adaptors (HBAs) for a plurality of alternate nodes with respect to a node; wherein the plurality of duplicate, standby HBAs use duplicate credentials of active HBAs of the node for performing one of shutting down the node, taking an active HBA of the node offline, and activating one of the plurality of alternate nodes;
   shutting down a failed node by an active one of the plurality of alternate nodes using a fence device; and
   taking over all jobs of the failed node by the active node using a shared data structure including SCSI device assignments, SCSI reservations, and required host notifications.

2. The method of claim 1, further including, subsequent to determining the node has failed, performing at least one of:
   bringing up standby ports of the plurality of duplicate, standby HBAs by the active node, and
   registering the standby ports of the plurality of duplicate, standby HBAs using the duplicate credentials of the failed node, wherein the duplicate credentials include at least duplicate address links of the active HBAs of the failed node.

3. The method of claim 2, further including notifying a host of port configuration changes, wherein the host logs into the standby ports.

4. The method of claim 1, further including performing at least one of:
   maintaining ports of the failed node in a down state while reactivating the failed node,
   issuing a notification to an active one of the plurality of alternate nodes with respect to the failed node that the failed node is now a reactivated node,
   shutting down the plurality of duplicate, standby HBAs by the active one of the plurality of alternate nodes, and
   activating by the reactivated node the HBAs of the reactivated node.

5. The method of claim 1, further including setting or determining a total a number of the plurality of duplicate, standby HBAs.

6. The method of claim 1, further including maintaining a minimum number of standby ports of the plurality of duplicate, standby HBAs.

7. The method of claim 1, further including mimicking an active HBA of the node by the plurality of duplicate, standby HBAs using duplicate world wide node name (WWNN) and world wide port name (WWPN) of the active HBAs of the node when the node is failing.

8. A system for efficient high availability for a small computer system interface (SCSI) target over a fibre channel in a computing environment, the system comprising:
   at least one processor device operable in the computing environment, wherein the at least one processor device:
   uses a plurality of duplicate, standby host-bus adaptors (HBAs) for a plurality of alternate nodes with respect to a node; wherein the plurality of duplicate, standby HBAs use duplicate credentials of active HBAs of the node for performing one of shutting down the node, taking an active HBA of the node offline, and activating one of the plurality of alternate nodes;
   shuts down a failed node by an active one of the plurality of alternate nodes using a fence device; and
   takes over all jobs of the failed node by the active node using a shared data structure including SCSI device assignments, SCSI reservations, and required host notifications.

9. The system of claim 8, wherein the at least one processor device, subsequent to determining the node has failed, performs at least one of:
   bringing up standby ports of the plurality of duplicate, standby HBAs by the active node, and
   registering the standby ports of the plurality of duplicate, standby HBAs using the duplicate credentials of the failed node, wherein the duplicate credentials include at least duplicate address links of the active HBAs of the failed node.

10. The system of claim 9, wherein the at least one processor device notifies a host of port configuration changes, wherein the host logs into the standby ports.

11. The system of claim 8, wherein the at least one processor device performs at least one of:
    maintaining ports of the failed node in a down state while reactivating the failed node,
    issuing a notification to an active one of the plurality of alternate nodes with respect to the failed node that the failed node is now a reactivated node,
    shutting down the plurality of duplicate, standby HBAs by the active one of the plurality of alternate nodes, and
    activating by the reactivated node the HBAs of the reactivated node.

12. The system of claim 8, wherein the at least one processor device sets or determines a total a number of the plurality of duplicate, standby HBAs.

13. The system of claim 8, wherein the at least one processor device maintains a minimum number of standby ports of the plurality of duplicate, standby HBAs.

14. The system of claim 8, wherein the at least one processor device mimics an active HBA of the node by the plurality of duplicate, standby HBAs using duplicate world wide node name (WWNN) and world wide port name (WWPN) of the active HBAs of the node when the node is failing.

15. A computer program product for efficient high availability for a small computer system interface (SCSI) target over a fibre channel using a processor device, the computer program product comprising a non-transitory computer-readable storage medium having computer-readable program code portions stored therein, the computer-readable program code portions comprising:

an executable portion that uses a plurality of duplicate, standby host-bus adaptors (HBAs) for a plurality of alternate nodes with respect to a node; wherein the plurality of duplicate, standby HBAs use duplicate credentials of active HBAs of the node for performing one of shutting down the node, taking an active HBA of the node offline, and activating one of the plurality of alternate nodes;

an executable portion that shuts down a failed node by an active one of the plurality of alternate nodes using a fence device; and an executable portion that takes over all jobs of the failed node by the active node using a shared data structure including SCSI device assignments, SCSI reservations, and required host notifications.

16. The computer program product of claim 15, further including an executable portion that, subsequent to determining the node has failed, performs at least one of:

bringing up standby ports of the plurality of duplicate, standby HBAs by the active node, registering the standby ports of the plurality of duplicate, standby HBAs using the duplicate credentials of the failed node, wherein the duplicate credentials include at least duplicate address links of the active HBAs of the failed node, and notifying a host of port configuration changes, wherein the host logs into the standby ports.

17. The computer program product of claim 15, further including an executable portion that performs at least one of:

maintaining ports of the failed node in a down state while reactivating the failed node, issuing a notification to an active one of the plurality of alternate nodes with respect to the failed node that the failed node is now a reactivated node, shutting down the plurality of duplicate, standby HBAs by the active one of the plurality of alternate nodes, and activating by the reactivated node the HBAs of the reactivated node.

18. The computer program product of claim 15, further including an executable portion that sets or determines a total a number of the plurality of duplicate, standby HBAs.

19. The computer program product of claim 15, further including an executable portion that maintains a minimum number of standby ports of the plurality of duplicate, standby HBAs.

20. The computer program product of claim 15, further including an executable portion that mimics an active HBA of the node by the plurality of duplicate, standby HBAs using duplicate world wide node name (WWNN) and world wide port name (WWPN) of the active HBAs of the node when the node is failing.

* * * * *